Figure 1A:
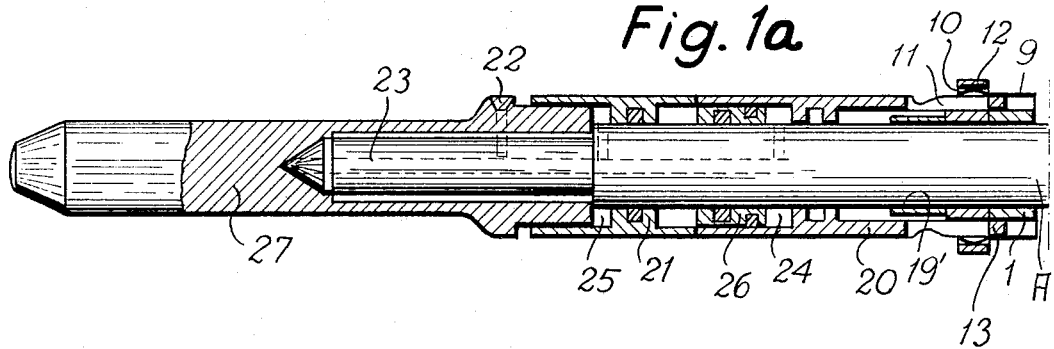

United States Patent Office 3,297,270
Patented Jan. 10, 1967

3,297,270
DRIVING SPINDLE FOR WINDING UP
OF STRIPS OF FOIL MATERIAL
Viggo Larsen, Herlev, and Borge Larsen, Vanlose, Copenhagen, Denmark, assignors to Nordisk Plaster Industri A/S, Copenhagen, Denmark
Filed Mar. 27, 1964, Ser. No. 355,342
Claims priority, application Denmark, Apr. 5, 1963, 1,609/63
5 Claims. (Cl. 242—56.9)

The present invention relates to a driving spindle for the winding up of strips of foil material under maintenance of firm contact with a number of cores for rolls of the said material disrtibuted along a through-going shaft and driven by means of friction devices, the said cores being placed at intervals along the spindle, and their positions on the spindle being maintained by means of radially expansible expansion devices operated from one or both ends of the spindle.

Such expansion devices, for example expansion tubes provided with longitudinal flexible bars which under the influence of pressure can be made to curve outwards, are used not only to secure firm contact with cores for paper rolls having a width which largely corresponds to the total length of the spindle, but also to secure firm contact with narrower cores placed at intervals on the spindle, for example of the type occurring in cutting machines, where a length of foil from a wide roll is unwound and by means of a cutting device divided into strips, every second one of which is led to one driving spindle for winding up, whereas the interjacent strips are led to another driving spindle. Before the winding is started the individual core can in one operation be slid on to the spindle by means of an interspacing gauge and quickly fixed in their respective places through expansion of the spindle by mechanical, hydraulic or pneumatic means. This arrangement has the drawback that all the cores will invariably keep pace with the rotary speed of the spindle, which has the effect that the rolls, for example, of adhesive tape, wound on one and the same driving spindle may be wound with widely different tightness, as it is impossible in practice to produce a length of foil of exactly the same thickness and tension across its width i.e. wherein a uniform resistance is exerted across the width of the strip against the pull produced by the driving spindle during winding. The result of this is particularly conspicuous in the adhesive tape industry where in the same batch, rolls wound with suitable tightness may be adjacent both rolls so loosely wound that they get a strained defaced appearance owing to air space between the layers, and rolls so tightly wound that after storage they show a tendency to become cone-shaped.

It has been attempted to remedy these undesirable conditions by using driving spindles where the cores are slid into their places on the spindle singly and alternating with spacer rings, as in this way a sort of individual friction coupling is established between the shaft and each core, since the motive power is transmitted by friction between the edges of the cores and the spacer rings. Friction coupling can also be established through a design of the spindle with disc clutches on both sides of each core. However, these methods are slow and difficult and still not satisfactory as, in spindles of the former type, the friction between the individual spacer rings and the cores which they act upon will vary considerably, even when the pull is completely uniform throughout the width of the foil, dependent on slight roughness or burrs on the edge of the cores. To this should be added that when the cores are of cardboard, as is often the case, the friction will vary with the degree of moisture of the cardboard. In spindles of the latter type the friction caused by the disc clutches will vary since the spring pressure exerted from one end of the shaft which is transmitted through the discs and the cores is decreasing from one end of the shaft towards the other end. Moreover, slight inexactitudes in the axial dimensions of the discs and the cores will be summed up along the shaft, and this too may exert influence on the amount of friction.

The purpose of the present invention is to remedy these drawbacks of the known driving spindles and to create a spindle which can produce a number of completely uniform rolls of foil material, all of which be wound up with the same degree of tightness, and all being completely uniform in appearance even if they are of a transparent material.

This has been accomplished in the driving spindle according to the present invention which is characterized by having expansion rings suspended on the through-going shaft to carry each individual core or a small number of cores placed side by side, the said expansion rings having radially expansible sections for the fixing of the cores and each expansion ring being unrotatably connected with friction devices adapted to bear on the shaft with a constant pressure.

In this way it is obtained that the cores are fixed securely in their places on the spindle, and that irrespective of variations in the resistance which the individual strips may exert against the winding the spindle produces a constant uniform tension in all the strips corresponding to the force that can be transmitted from the through-going shaft to the friction devices pressing on it a constant pressure. It has turned out in practice that rolls of transparent adhesive tape wound in this way distinguish themselves clearly by their uniformity from rolls wound on driving spindles of known design.

A preferred embodiment of the driving spindle according to the invention is characterized by having each expansion ring suspended on a support ring which in one or more internal axial grooves thereof has friction members which can couple the ring with the shaft, and which is external grooves thereof has fixing members to press the expansible sections of the expansion ring outwards against the inside of the core. By dividing the suspension members for each core into two rings, as just described, one of which carries out the fixing function and the other the friction-transmitting driving function, a relatively cheap and effective suspension is obtained.

A uniform and easily adjustable friction coupling for the individual suspension units is obtained when, according to the invention, the friction members consist of pads either constituted of or having a facing of friction material which is pressed against the circumference of the shaft by a leaf spring parallel to the shaft and with adjustable spring tension.

According to the invention the radially expansible part of the expansion ring may consist of resilient tongues formed by axial or circumferential incisions in the wall of the ring, while the fixing members are rods with a wedge-shaped part or a recess facing the tongue, the said rods being placed axially slidable in grooves under the resilient tongues. In this way it is achieved that all the cores can quickly be fixed on the spindle by simultaneous axial sliding of all the fixing members, so that the resilient tongues of the expansion rings are forced outwards, as part of each tongue by the movement of the rod lying under it is forced out of the recess in which it rests when the expansion ring is not expanded.

According to the invention the rods may have a recess adapted to act together with a boss or ball to lift the tongues of the expansion ring. In this way it is achieved that the expansion tube can be made of very thing material without any risk that the pressure of the tongues against the core will in the course of time be changed by flattening of the tongues, as the pressure is transmitted from the rods to the core directly through the ball or the cam.

According to the invention it is expedient that in each expansion ring there is a thrust collar around the shaft for the transmission of an axial pressure from the end of the spindle to all fixing members. In this way a uniform transmission of pressure is achieved from the rods in one support ring to the rods in the following one.

One embodiment of the driving spindle according to the invention is characterized by having the thrust collars suspended at a distance around and slidable over spacer rings, which have a smaller external diameter than the support rings and are placed between them. In this way it is avoided that friction forces are transmitted from one support ring to a neighboring expansion ring through the thrust collar.

Another embodiment of the driving spindle according to the invention is characterized by having each support ring suspended on the neck of a spacer ring, such neck ring having the same length as the support ring. In this way it is achieved that the driving spindle will be easier to assemble correctly, as it is made up of fewer components than the embodiment described above.

The rods which act on the expansion rings so that they expand or contract can be moved by mechanical, hydraulic or pneumatic means, and according to the invention the axial pressure can be transmitted to the rods and the thrust collars by means of actuator bushes mounted around the shaft at least at one end of the driving spindle. Such actuator bushes act simultaneously on the outermost components in all the rows of wedges whereby slanting actuation and blocking of the rods are prevented.

Figure 1B:
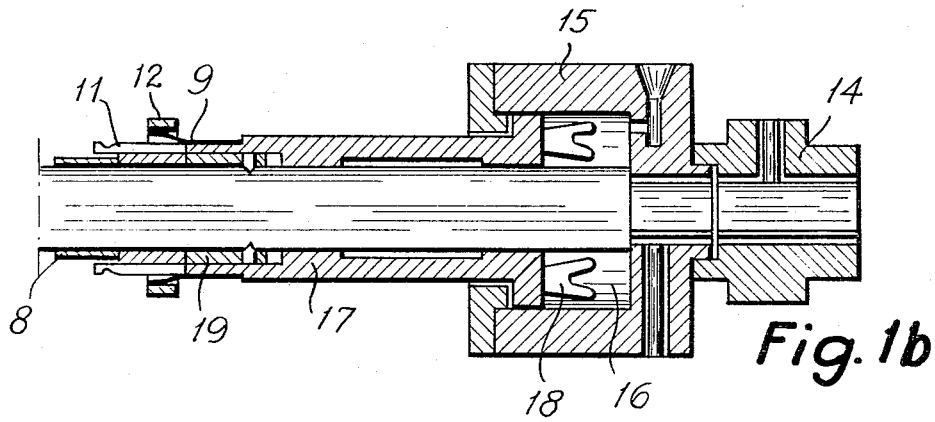
Figure 2:
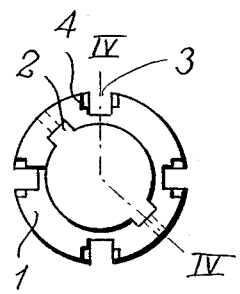
Figure 3:
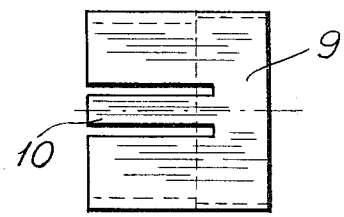
Figure 4:
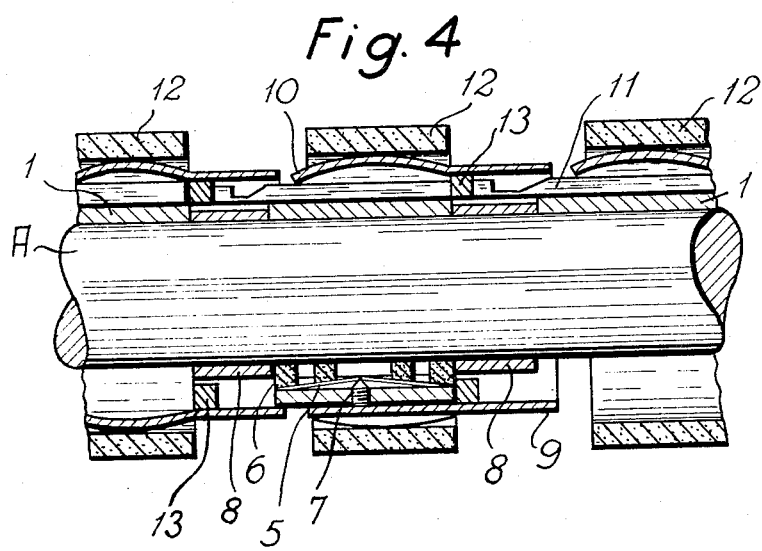
Figure 5:
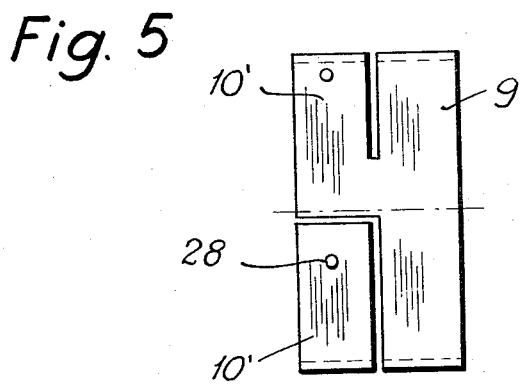
Figure 6:
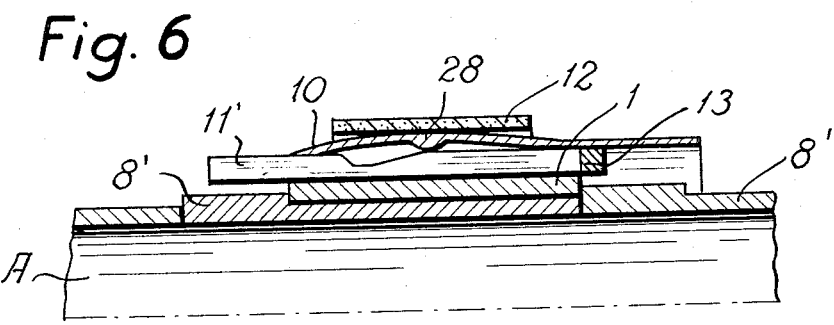

The invention will be explained in greater detail with reference to the attached drawing wherein:

FIG. 1a shows the front portion of a preferred embodiment of the driving spindle according to the invention, partly in section, FIG. 1b shows the rear portion of the driving spindle also partly in section, FIG. 2 is an end view of a support ring for the driving spindle, FIG. 3 is a side view of an expansion ring for the driving spindle, FIG. 4 is a sectional view on enlarged scale taken along line IV—IV in FIG. 2, FIG. 5 shows another embodiment of an expansion ring, and FIG. 6 shows a portion of another embodiment of the driving spindle according to the invention.

The driving spindle shown is adapted for the winding up of a number of rolls of tape-shaped material and can, for example, find application in a cutting machine where a length of foil material from a wide reel passes a cutting mechanism, after which the strips thus formed are led to two or more driving spindles where they are wound up, so that a gap appears between the individual rolls. The illustrated driving spindle has a through-going shaft A on which is suspended a number of support rings 1 which, as it will appear from FIGS. 2 and 4, have two internal axial grooves 2 and four external axial grooves 3. The grooves 3 at one end of the ring pass into wider openings 4 at the upper edges of the grooves the function of which will be made apparent hereinafter. In one of the internal grooves 2 is disposed a leaf spring 5 which on the side facing the shaft A has a pad 6 or a facing of friction material, such as nylon. The pad 6 may also be separate from the spring and inserted loosely in the groove. In the other internal groove there can be a lubricant. The spring pressure against the shaft can be adjusted by means of a radial adjusting screw 7 which is screwed into the ring 1 and presses on the middle of the leaf spring 5.

The support rings 1 are mutually separated by means of spacer rings 8, and around each support ring is suspended an expansion ring 9. For the fixing of a core, for example a cardboard cylinder, so that it is carried along when the expansion ring rotates, the ring is provided with resilient tongues 10 formed by slits extending from one end of the ring as shown in FIG. 3 (wherein are shown four such tongues). In FIG. 5 is shown an expansion ring 9 with tongues 10' made by circumferential incisions, each having a depression 28 by means of which the tongue can be pressed outwards. In the external grooves 3 on the support ring 1 there are axially slidable rods 11 having a wedge-shaped part, and when these rods are in the position shown in FIG. 4, they press the tongues 10 outwards against the core 12 thereby keeping it in place and carrying it along when the expansion ring rotates. The resilient tongues 10 are wider than the rods 11 and the grooves 3 in the support ring 1. When the core 12 is free to rotate on the shaft the end of each tongue 10 will enter the wedge-shaped recess in the rod 11 and the parts of the end of the tongues extending laterally beyond the rod will enter into the wider opening 4 at the upper edges of the groove. The rods 11 are moved axially under the influence of pressure from the ends of the spindle, and the pressure is transmitted from the rods in one support ring to the rods in the following support ring by means of thrust collars 13 which are slidably mounted in the unslit part of the expansion rings and suspended at a distance around the spacer rings 8, so that they cannot transmit friction forces from the through-going shaft A or from a support ring 1 to the expansion ring 9 suspended on it.

The exertion of pressure on the rods for the controlling of the expansion and constraction of the expansion rings can be effected by arbitrary means as desired. In the example shown the controlling is pneumatic, as, both at the headstock end, shown to the right in FIG. 1b, and at the tailstock end, shown to the left in FIG. 1a, the spindle can be connected to a supply of compressed air, which via actuator bushes acts on the outermost rods at either end. Thus, at the headstock end of the driving spindle next to the headstock 14 there is a cylindrical casing 15 with a compressed air chamber 16 in which the head of an actuator bush 17 is slidably suspended on the shaft A and can be slid to the position shown in FIG. 1b by means of compressed air acting on a sleeve 18, whereby all the rods 11 are moved to the position shown in FIG. 4 causing the expansion rings to be expanded. The actuator bush 17 is stopped in its extreme position when an internal stop contacts a stop ring 19 on the shaft.

When the cores are to be released from the driving spindle, the rods 11 are moved to the right in FIGS. 1a and 1b by means of compressed air which in this case acts on two actuator bushes 20 and 21 respectively, whereby the aggregate piston area exposed to air pressure is equal to that at the headstock end, even though the diameter of the spindle must be smaller to permit its insertion in the machine. Compressed air is supplied through a hole 22 to an axial bore 23 in the shaft A, and from here it is led through radial channels to pressure chambers 24 and 25 respectively, whereby the actuator bushes 20 and 21 are displaced to the right in FIGURE 1a until bush 20 contacts a stop ring 19' mounted on the shaft, in which position all the rods 11 will have been moved to the right, so that the tongues 10, which are resilient, will spring back into the grooves 3 and their widened openings 4 (FIG. 2), whereby the cores are released. The pressure in the pressure chamber 24 presses the actuator bush 20 to the right (see FIG. 1a) as a seal ring 26 is held in place on the shaft in tight contact with it and with the actuator bush, while the pressure in the chamber 25 presses the actuator bush 21 to the right as the tail end 27 of the spindle is supported in axially secured relation.

In the embodiment shown in FIG. 6 the spacer rings 8' are designed so that they cover the whole shaft lying end to end. The support rings 1 are suspended on the spacer rings and are held mutually apart by means of a shoulder on each spacer ring. The rods 11' have a recess into which a boss 28 can enter when the expansion ring is to contract.

By means of an interspacing gauge the cores can quickly be slid on to the driving spindle from its tail end, after which the spindle can be set up in the winding machine, and compressed air is admitted for simultaneous fixing of all the cores, after which the winding process may be started at once. Irrespective of variations of the pull in the different strips owing to want of uniformity of the material all the rolls will be wound up with the same tension, since the tractive force that can be transmitted from the shaft A to every single one of the cores is constant and only depends upon the friction between the friction material 6 and the surface of the shaft.

It will be understood that satisfactory results can be obtained even if two or more narrow cores are placed on each expansion ring if there are only slight transversal variations in the thickness and quality of the material.

What we claim and desire to secure by Letters Patent is:

1. A driving spindle for the winding of strips of foil material on a number of cores to form uniform rolls of said material wound to the same degree of tightness, said spindle comprising, a through-going shaft, a number of support rings along said shaft each having an internal axial groove, friction means in each said groove engaging the shaft to frictionally couple the associated ring and the shaft together, each said ring having external grooves, axialy slidable fixing members mounted on said shaft and extending into the external grooves of the rings, said fixing members including portions of wedge shape, one radially expansible expansion ring suspended on each support ring for the fixing of at least one individual core thereon, each expansion ring including resilient members which engage said fixing members for being expanded by the wedge shape portions thereof during axial movement of said fixing members to press against the inside of the associated core, spacer rings along the shaft between adjacent support rings to maintain the same apart, one thrust collar supported at a distance around and axially slidable over each spacer ring and having a smaller diameter than the support rings, for engaging the fixing members to transmit axial pressure thereto and cause sliding thereof, and actuator bushes mounted on the shaft at least at one end of the spindle for the transmission of axial pressure to the thrust collars and the fixing members.

2. A driving spindle according to claim 1 in which the friction means comprises pads of friction material in said internal grooves and leaf springs also in said grooves extending parallel to the shaft and engaging said pads to urge the same against the shaft, and means for adjusting the spring tension of said leaf springs against the circumference of the shaft.

3. A driving spindle according to claim 2 wherein said leaf springs and pads are integral.

4. A driving spindle according to claim 1 wherein said fixing members are rods each of which has a recess adapted to cooperate with a boss to lift up the associated resilient members of an expansion ring.

5. A driving spindle according to claim 1 in which each support ring is suspended on an adjacent spacer ring on a neck thereof, such neck having the same length as the support ring.

References Cited by the Examiner

UNITED STATES PATENTS

| | | | |
|---|---|---|---|
| 2,890,001 | 6/1959 | Triquet | 242—72.1 |
| 3,010,671 | 11/1961 | Brown | 242—56.9 |
| 3,113,744 | 12/1963 | Nisenson | 242—72 |

FOREIGN PATENTS

| | | |
|---|---|---|
| 105,403 | 9/1942 | Sweden. |

OTHER REFERENCES

Tungler: German Application No. 1,140,424, pub. Nov. 29, 1962.

FRANK J. COHEN, *Primary Examiner.*

STANLEY N. GILREATH, W. S. BURDEN,
*Assistant Examiners.*